United States Patent
Yu et al.

(10) Patent No.: US 10,817,984 B2
(45) Date of Patent: Oct. 27, 2020

(54) IMAGE PREPROCESSING METHOD AND DEVICE FOR JPEG COMPRESSED FILE

(71) Applicant: ABC FINTECH CO., LTD., Beijing (CN)

(72) Inventors: Zhou Yu, Beijing (CN); Yongzhi Yang, Beijing (CN); Meng Guo, Beijing (CN)

(73) Assignee: ABC FINTECH CO., LTD., Beijing (CN)

(*) Notice: Subject to any disclaimer, the term of this patent is extended or adjusted under 35 U.S.C. 154(b) by 365 days.

(21) Appl. No.: 15/955,631

(22) Filed: Apr. 17, 2018

(65) Prior Publication Data

US 2019/0266703 A1    Aug. 29, 2019

(30) Foreign Application Priority Data

Feb. 26, 2018  (CN) .......................... 2018 1 0162773

(51) Int. Cl.
| | | |
|---|---|---|
| *G06T 3/40* | (2006.01) | |
| *G06T 5/00* | (2006.01) | |
| *H04N 19/46* | (2014.01) | |
| *G06K 9/62* | (2006.01) | |

(Continued)

(52) U.S. Cl.
CPC .............. *G06T 3/4046* (2013.01); *G06K 9/46* (2013.01); *G06K 9/6256* (2013.01); *G06N 3/08* (2013.01); *G06T 3/4007* (2013.01); *G06T 5/002* (2013.01); *H04N 19/46* (2014.11); *G06T 2207/20081* (2013.01); *G06T 2207/20182* (2013.01)

(58) Field of Classification Search
CPC ...... G06K 9/46; G06K 9/6256; G06N 3/0454; G06N 3/08; G06N 3/084; G06T 2207/20081; G06T 2207/20182; G06T 3/4007; G06T 3/4046; G06T 5/002; H04N 19/46

See application file for complete search history.

(56) References Cited

U.S. PATENT DOCUMENTS 10,623,775 B1 * 4/2020 Theis ..................... H04N 19/61
2013/0034313 A1 * 2/2013 Lin ....................... G06T 3/4053
                                                           382/299

(Continued)

OTHER PUBLICATIONS

Beyond a Gaussian Denoiser: Residual Learning of Deep CNN for Image Denoising Kai Zhang ; Wangmeng Zuo ; Yunjin Chen ; Deyu Meng ; Lei Zhang IEEE Transactions on Image Processing; Year: 2017 | vol. 26, Issue: 7 | Journal Article | Publisher: IEEE (Year: 2017).*

*Primary Examiner* — Kim Y Vu
*Assistant Examiner* — Michael J Vanchy, Jr.
(74) *Attorney, Agent, or Firm* — Morgan, Lewis & Bockius LLP (57) ABSTRACT

The invention relates to an image preprocessing method and device for a JPEG compressed file. The method comprises the following steps: receiving a JPEG image to be processed; and de-noising the received JPEG image by using a pre-trained full convolutional network model to obtain a de-noised and resolution-improved image. The method and the device in the invention can effectively improve the definition of an image in an electronic file, thus effectively facilitate the subsequent image-based file analysis, e.g., OCR and CHART parsing.

10 Claims, 5 Drawing Sheets

(51) Int. Cl.
    *G06K 9/46*         (2006.01)
    *G06N 3/08*         (2006.01)

(56) References Cited

U.S. PATENT DOCUMENTS

2017/0132763 A1* 5/2017 Salvador Marcos ........................ G06K 9/6218
2017/0345130 A1* 11/2017 Wang .................... G06T 3/4053

* cited by examiner

IMAGE PREPROCESSING METHOD AND DEVICE FOR JPEG COMPRESSED FILE

CROSS-REFERENCE TO RELATED APPLICATION

This application claims the benefit of Chinese Patent Application No. 201810162773.8, filed Feb. 26, 2018 with State Intellectual Property Office, the People's Republic of China, the entire content of which is incorporated by reference herein.

TECHNICAL FIELD

The present application relates to the technical field of data processing, and particularly, relates to an image preprocessing method and device for a JPEG compressed file.

BACKGROUND

The main purpose of image de-noising is to remove image noise and to retain useful information in an image as much as possible. Common image de-noising methods include median filtering, Gauss filtering, bilateral filtering and the like. Different filtering methods have different effects when processing different noises. The median filtering has a better effect when processing salt and pepper noise, the Gauss filtering has a better effect on Gauss noise, and the bilateral filtering can better retain edge information when removing noise. However, in the existing image de-noising algorithms, there has not been an effective denoising method which is specialized for the noise caused by JPEG compression of an electronic graph file.

SUMMARY

An objective of the present application is to overcome the defect in the prior art that there has not been an effective denoising method which is specialized for the noise caused by JPEG compression of an electronic graph file, and to provide an image preprocessing method and device for a JPEG compressed file.

In order to fulfill the above objective, embodiments of the present application provide the following technical solutions:

In one aspect, an embodiment of the present application provides an image preprocessing method on an electronic device for processing a JPEG image, including:

receiving, by the electronic device a JPEG image to be processed and displaying it on a display of the electronic device;

de-noising the received JPEG image by using a pre-trained full convolutional network model stored in the electronic device to obtain a de-noised and resolution-improved image; and displaying the de-noised and resolution-improved image on the display.

The full convolutional network model includes an input layer, convolutional layers, an activation layer, residual modules, a BN layer and a sub-pixel layer.

The full convolutional network model is derived via the following training steps:

a. randomly initializing parameters of the full convolutional network model;

b. randomly selecting batchsize sample pictures, and randomly cutting an image, of which the size is W*H, on each sample picture as a target image sample for current iteration, wherein batchsize indicates a batch size;

c. normalizing each pixel in the target image samples;

d. performing n-fold resolution reduction of bilinear interpolation on the target image samples, and performing JPEG compression according to a random compression ratio to obtain simulated JPEG compression images of which the size is $$\frac{W}{n} * \frac{H}{n},$$

wherein n is a positive integer;

e. inputting the batchsize JPEG images obtained in step d to the full convolutional network model of step a to obtain output images of which the size is W*H;

f. calculating a current mean square error loss for the current iteration:

$$loss = \frac{1}{batchsize * W * H} \sum_{x=1}^{W} \sum_{y=1}^{H} (target - output)^2,$$

wherein target is a target value of a target image sample, and output is an output value obtained by inputting the corresponding JPEG image after the n-fold resolution reduction to the full convolutional network model;

g. updating the parameters of the current full convolutional network model by using a BP algorithm; and repeatedly executing steps b to g until reaching a preset number of iterations.

In another aspect, an embodiment of the present application provides an image preprocessing device for a JPEG compressed file, including:

an image receiving module, configured to receive a JPEG image to be processed; and an image preprocessing module, configured to de-noise the JPEG image to be processed received by the image receiving module by using a pre-trained full convolutional network model to obtain a de-noised and resolution-improved image.

In a further aspect, an embodiment of the present application provides a computer readable storage medium including computer readable instructions, wherein a processor executes the operations in the method of the embodiment of the present application when the computer readable instructions are executed.

In a still further aspect, an embodiment of the present application provides an electronic device, including: a memory, configured to store program instructions; and a processor, connected with the memory, and configured to execute the program instructions in the memory to implement the steps of the method in the embodiment of the present application.

Compared with the prior art, the present application has the advantages as below: in the present application, JPEG de-noising and resolution improvement on an image are performed by adopting a method based on deep learning, wherein input is an image of a JPEG format, while output is a non-destructive image format file of which the resolution is doubled and the JPEG compression noise is removed. The method and the device of the present application can effectively remove the noise generated by JPEG compression in an electronic file, improve the definition of an image in the electronic file, and effectively facilitate the subsequent image-based file analysis, e.g., OCR and CHART parsing.

BRIEF DESCRIPTION OF THE DRAWINGS

In order to illustrate the technical solutions in the embodiments of the present application more clearly, a brief introduction will be made below to the drawings required in the embodiments. It should be understood that the drawings described below are some embodiments of the present application only and should not be regarded as limiting the scope, and other relevant drawings could be obtained based on the drawings by those of ordinary skill in the art without any creative efforts.

DETAILED DESCRIPTION OF THE EMBODIMENTS

A clear and complete description will be made to the technical solutions in the embodiments of the present application below in combination with the drawings in the embodiments of the present application. Apparently, the embodiments described are only part of the embodiments of the present application, not all of them. Generally, the components of the embodiments of the present application described and shown in the drawings may be arranged and designed with various different configurations. Therefore, the detailed description of the embodiments of the present application provided in the drawings below is not intended to limit the protection scope of the present application, but only indicates the selected embodiments of the present application. All other embodiments obtained by those skilled in the art without creative efforts based on the embodiments of the present application shall fall within the protection scope of the present application.

An image preprocessing method for a JPEG compressed file, provided in this embodiment, includes the following steps:

Step A. receive a JPEG image to be processed.

Figure 1:
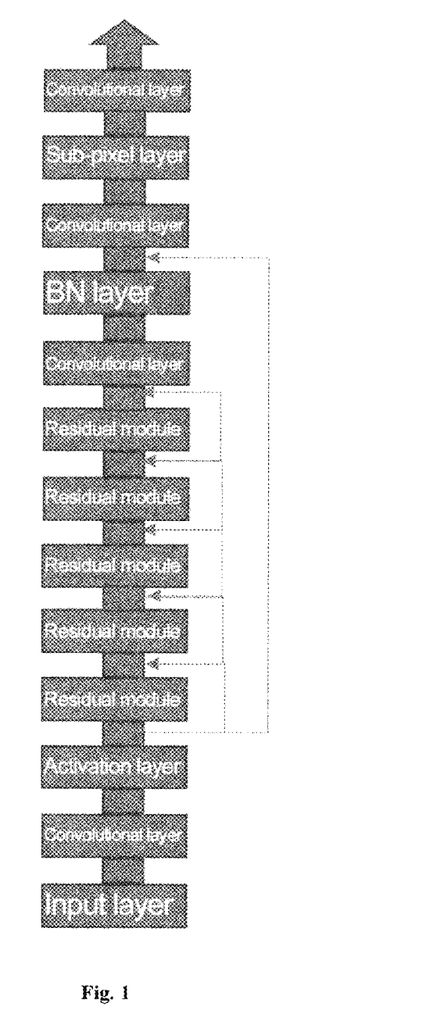
FIG. 1 is a structure diagram of a full convolutional network model according to some embodiments of the present application.

Step B. input the received JPEG image to a pre-trained full convolutional network model, and de-noise the JPEG image to be processed to obtain a de-noised and resolution-improved image. The structure of the full convolutional network model is as shown in FIG. 1, and may include an input layer, convolutional layers, an activation layer, residual modules, a batch norm (BN) layer and a sub-pixel layer. In this structure, the residual modules, for example, may be residual modules of a residual network (RESNET), and are configured to improve the final output precision of the network. The sub-pixel layer may be configured to improve the resolution of an image.

The full convolutional network model is an end-to-end deep learning model. By introducing the residual modules and the sub-pixel layer to the structure, the quality of the image can be effectively improved, the resolution of the image can be improved, so as to provide a basis for the subsequent structural restoration of graph data.

Figure 2:
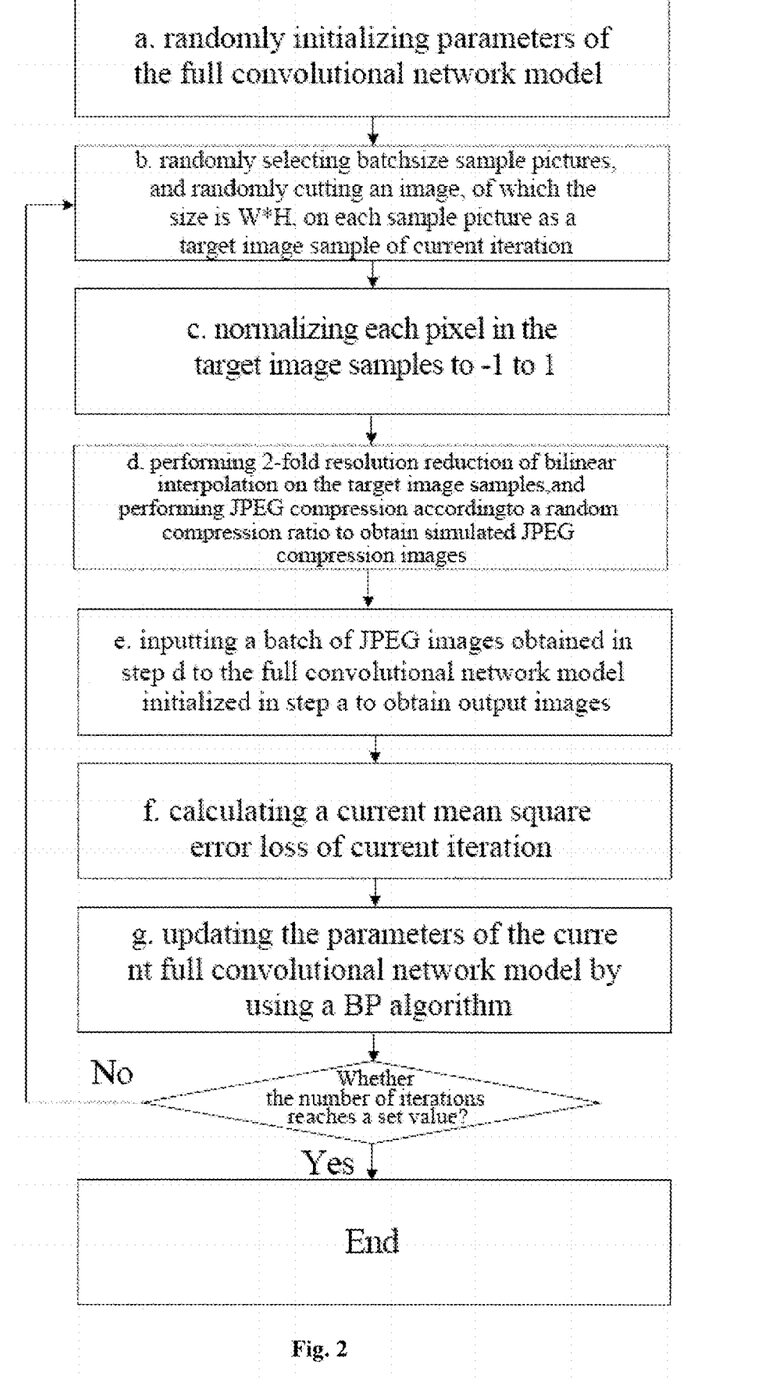
FIG. 2 is a training flow diagram of the full convolutional network model according to some embodiments of the present application.

Referring to FIG. 2, in this embodiment, the above-mentioned full convolutional network model can be derived via the following training steps:

a. randomly initialize parameters of the full convolutional network model;

b. randomly select batchsize sample pictures, and randomly cut an image, of which the size is W*H, on each sample picture as a target image sample of current iteration, wherein batchsize indicates a batch size;

c. normalize each pixel in the target image samples to −1 to 1.

It should be noted that the data normalization is often needed in data preprocessing of deep learning to accelerate network convergence. In principle, the pixels may not be normalized to −1 to 1, and other range is also available. Herein, each pixel in the target image samples is normalized to −1 to 1, i.e., a mean zero, in order to further accelerate network convergence and reduce the running time.

d. perform 2-fold resolution reduction of bilinear interpolation on the target image samples, and perform JPEG compression according to a random compression ratio to obtain simulated JPEG compression images of which the size is $$\frac{W}{2} * \frac{H}{2}.$$

This step is to obtain a pattern of a noise image in the actual file by a closest simulation. According to different random compression ratios, the images of various JPEG image qualities can be obtained, so that the adaptability of the model is stronger.

It should be noted that, for the application scene of FIG. 4 in the embodiment, the following file analysis work can be met only by improving the resolution of the JPEG image by 2 folds, so 2-fold resolution reduction is performed herein. For different application scenes, different settings may be performed, the resolution is improved by n folds, such as 2 folds, 4 folds, or 8 folds. Only the corresponding sub-pixel layer is increased in the structure of the full convolutional network model, and one sub-pixel layer may double the resolution. The 2-fold magnification setting not only meets the requirement of application, but also can simplify the model structure.

e. input a batch of (i.e., batchsize) JPEG images obtained in step d to the full convolutional network model initialized in step a to obtain output images having the size of W*H;

f. calculate a current mean square error loss for the current iteration:

$$\text{loss} = \frac{1}{batchsize * W * H} \sum_{x=1}^{W} \sum_{y=1}^{H} (\text{target} - \text{output})^2,$$

wherein target is a target value of a target image sample, and output is an output value obtained by inputting the corresponding low-resolution (i.e., resolution after the 2-fold resolution reduction) JPEG image to the full convolutional network model;

g. update the parameters of the current full convolutional network model by using a BP algorithm; and repeatedly execute steps b to g until reaching a preset number of iterations.

For example, in order that the full convolutional network model has de-noising and resolution improving effects, the required sample is trained and output in the form of a PNG high-definition image, and the low-resolution JPEG image is randomly generated in model training. The target PNG image may be drawn via a vector PDF according to the assigned high resolution (e.g., a resolution of 1600*1200), and 100000 images are randomly selected for training the model and stored in a disk as sample pictures.

a. randomly initialize parameters of the full convolutional network model.

b. randomly select 32 (batchsize) sample pictures of a PNG format, and randomly cut a 128*128 image on each sample picture as a target image sample (RGB 3 channels) of current iteration, having the size of 32 (batchsize)*128 (height)*128 (width)*3 (channels).

c. normalize each pixel in the target image samples to −1 to 1. Specifically, the pixel value in the target image sample (PNG format) is 0 to 255. In order to normalize the pixel value to −1 to 1, the pixel value x needs to subtract 128 and then is divided by 128, i.e., a (x−128)/128 operation is performed on the pixel value of each pixel, and the pixel value can be normalized to −1 to 1.

d. perform 2-fold resolution reduction of bilinear interpolation on the target image samples, and perform JPEG compression according to a random compression ratio to obtain simulated JPEG compression images of which the size is 32*64*64*3;

e. input the 32 (batchsize) JPEG images obtained in step d to the full convolutional network model of step a to obtain output images having the size of 32*128*128*3.

It can be seen from steps d and e that, after the JPEG compression images are output from the full convolutional network model, the resolution is doubled, i.e., improved from 64*64 to 128*128.

f. calculate a current mean square error loss for the current iteration:

$$loss = \frac{1}{batchsize * W * H} \sum_{x=1}^{W} \sum_{y=1}^{H} (target - output)^2.$$

In this exemplary application, W=128, H=128, batchsize=3, the sizes of target and output are both 32*128*128*3, i.e., batchsize*W*H*3.

g. minimize the mean loss of the batchsize target image samples by using a BP algorithm, and update the parameters of the current full convolutional network model. The BP algorithm is a standard method of parameter update in a neural network. When the parameters are updated, a gradient descent method, i.e., a method of finding a weight parameter W corresponding to the optimal solution loss, is adopted. The specific steps are as follows: solving a derivative for each parameter W in a loss function, finding a negative gradient direction dW of each parameter, and then performing a small step update, i.e., updating the weight W=W+ learning_rate*dW, wherein learning_rate is a learning rate or is understood as an update step length, for example, set to be 0.001. This step is iterated. Because the derivative is solved from a composite function (multilayer neural network), the chain rule in calculus is adopted. The chain rule is embodied as back propagation (BP) in the neural network, and BP is a dedicated term in the neural network. dW is calculated forward in sequence from the last layer.

Steps b to g are repeatedly executed until reaching a preset number of iterations. The number of iterations is set according to empirical values, e.g., the number of iterations may be set to 100,000 herein. When the number of iterations is set, its minimum should at least guarantee that the minimum mean loss no longer declines.

Figure 4A:
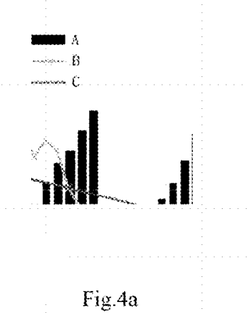
FIGS. 4a-d are respectively an original JPEG image, an effect diagram of doubling the resolution by bilinear interpolation, an effect diagram after Gauss filtering de-noising, and an effect diagram after de-noising of a method according to some embodiments of the present application.
Figure 4B:
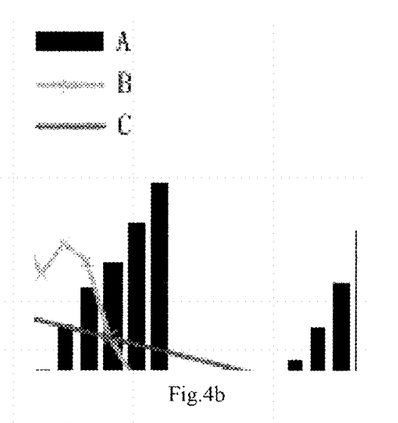
Figure 4C:
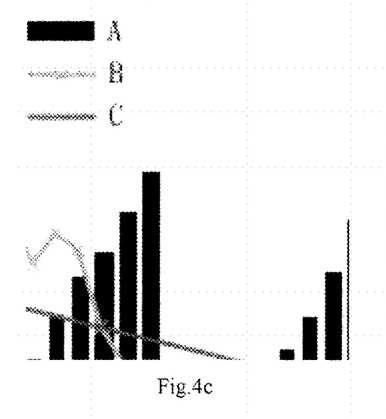
Figure 4D:
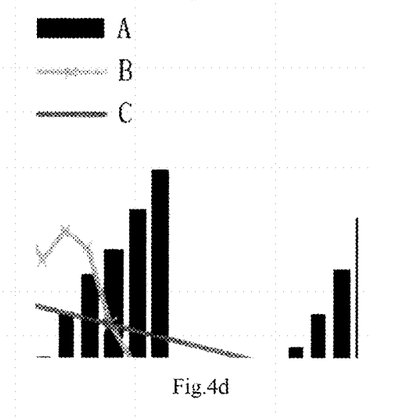

After the JPEG image to be processed is preprocessed by the above method, JPEG noise can be removed, and the resolution of the image can also be improved. Referring to FIGS. 4a-d, FIG. 4a is an original JPEG image (part of a complete low-resolution image), FIG. 4b is an effect diagram of doubling the resolution of the image by bilinear interpolation, FIG. 4c is an effect diagram after Gauss filtering de-noising on FIG. 4b, the Gauss filtering de-noising removes noise to a certain extent but makes the image fuzzy at the same time, FIG. 4d is an effect diagram output by adopting the above-mentioned trained full convolutional network model, and it can be obviously seen from FIG. 4d that the quality of the image is improved.

The pixel value of each pixel in the image output via the full convolutional network model is 0-255, whereas the value of each pixel in a conventional RGB image is an integer of 0-255, thus, in order to facilitate subsequent analysis on the image output by the full convolutional network model, the above preprocessing method further includes step C: de-normalize each pixel in the obtained de-noised and resolution-improved image to 0-255.

Figure 3:
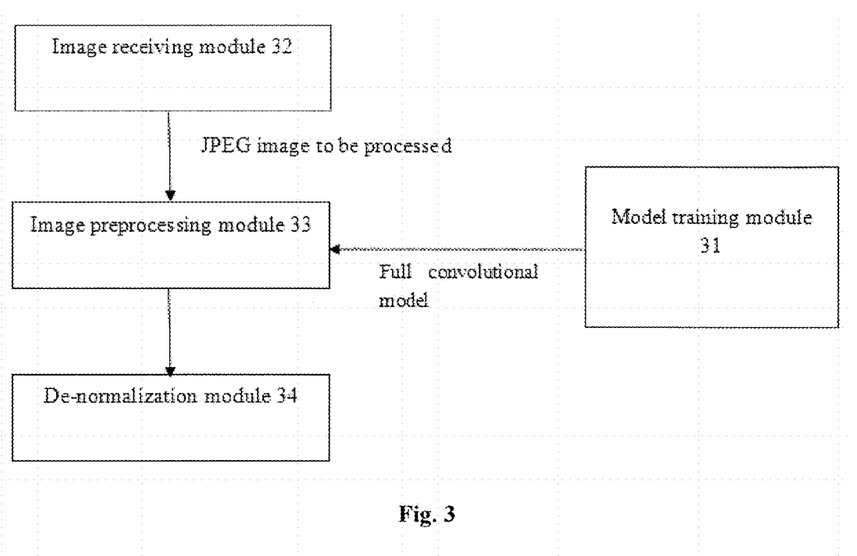
FIG. 3 is a schematic diagram of functional modules of an image preprocessing device for a JPEG compressed file according to some embodiments of the present application.

Based on the same inventive concept as the above method, an embodiment of the present application further provides an image preprocessing device for a JPEG compressed file. As shown in FIG. 3, the device mainly includes a model training module 31, an image receiving module 32, an image preprocessing module 33 and an optional de-normalization module 34.

The model training module 31 performs training in the following steps to obtain the full convolutional network model:

a. randomly initializing parameters of the full convolutional network model;

b. randomly selecting batchsize sample pictures, and randomly cutting an image, of which the size is W*H, on each sample picture as a target image sample of current iteration;

c. normalizing each pixel in the target image samples to −1 to 1;

d. performing 2-fold resolution reduction of bilinear interpolation on the target image samples, and performing JPEG compression according to a random compression ratio to obtain simulated JPEG compression images having the size of $$\frac{W}{2} * \frac{H}{2};$$

e. inputting a batch of JPEG images obtained in step d to the full convolutional network model of step a to obtain output images of which the size is W*H;

f. calculating a current mean square error loss for the current iteration:

$$\text{loss} = \frac{1}{Batchsize * W * H} \sum_{x=1}^{W} \sum_{y=1}^{H} (\text{target} - \text{output})^2,$$

wherein target is a target value of a target image sample, and output is an output value obtained by inputting the corresponding JPEG image after the 2-fold resolution reduction to the full convolutional network model;

g. updating the parameters of the current full convolutional network model by using a BP algorithm; and repeatedly executing steps b to g until reaching a preset number of iterations.

The image receiving module 32 is configured to receive a JPEG image to be processed;

the image preprocessing module 33 is configured to de-noise the JPEG image to be processed received by the image receiving module by using a pre-trained full convolutional network model to obtain a de-noised and resolution-improved image.

As an optional module, the de-normalization module 34 is configured to de-normalize each pixel in the obtained de-noised and resolution-improved image to 0-255.

For the parts in the embodiment of the image preprocessing device for a JPEG compressed file, reference may be made to the corresponding description in the foregoing embodiment of the image preprocessing method for a JPEG compressed file.

Figure 5:
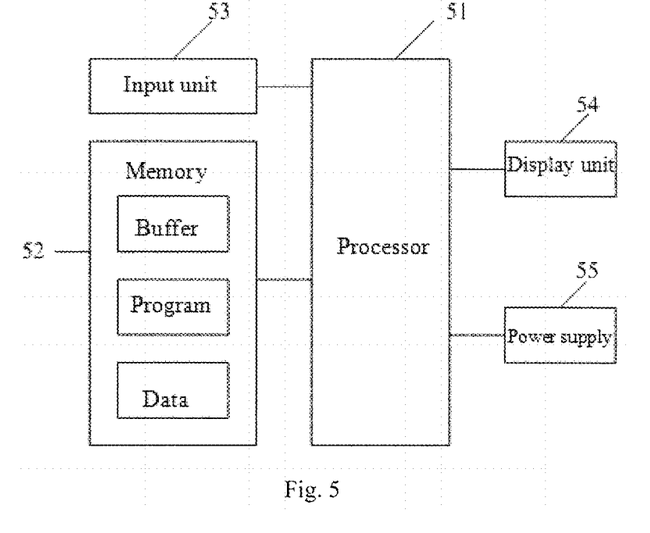
FIG. 5 is a structure block diagram of the electronic device according to some embodiments of the present application.

As shown in FIG. 5, this embodiment provides an electronic device. The electronic device may include a processor 51 and a memory 52, wherein the memory 52 is coupled to the processor 51. It should be noted that the figure is exemplary, and the structure may also be supplemented or replaced by using other structure to realize data extraction, graph redrawing, communication or other functions.

As shown in FIG. 5, the electronic device may further include an input unit 53, a display unit 54 and a power supply 55. It is worth noting that the electronic device does not necessarily include all components shown in FIG. 5. Moreover, the electronic device may further include components not shown in FIG. 5, referring to the prior art.

The processor 51 is also referred to as a controller or an operation control sometimes, and may include a microprocessor or other processor device and/or logic device. The processor 51 receives an input and controls the operation of each component of the electronic device.

The memory 52, for example, may be one or more of a cache, a flash memory, a hard driver, a mobile medium, a volatile memory, a non-volatile memory and other proper device, and may store configuration information of the processor 51, instructions executed by the processor 51, recorded graph data and other information. The processor 51 may execute a program stored in the memory 52 to implement information storage or processing or the like. In one embodiment, the memory 52 further includes a buffer memory, i.e., a buffer, to store intermediate information.

The input unit 53, for example, is configured to provide a sample image or a JPEG image to be processed for the processor 51. The display unit 54 is configured to display an effect diagram after preprocessing. The display unit, for example, may be a liquid crystal display (LCD), but the present application is not limited thereto. The power supply 55 is configured to supply power to the electronic device.

An embodiment of the present application further provides a computer readable instruction, wherein when the instruction is executed in the electronic device, the program enables the electronic device to execute the operation steps included in the method of the present application.

An embodiment of the present application further provides a storage medium storing a computer readable instruction, wherein the computer readable instruction enables the electronic device to execute the operation steps included in the method of the present application.

It should be understood that, in various embodiments of the present application, the serial numbers of the above-mentioned steps do not mean the execution sequence. The execution sequence of the steps should be determined based on the functions and inherent logics thereof, but should not constitute any limitation to the implementation process of the embodiment of the present application.

Those of ordinary skill in the art may realize that the units and method steps of each example described in combination with the embodiments disclosed in the present disclosure can be implemented by electronic hardware, computer software or the combination of computer software and the electronic hardware. In order to clearly describe the interchangeability of hardware and software, the composition and steps of each example are described generally above according to the functions. Whether these functions are executed by hardware or software depends on a specific application and design constraint conditions of the technical solution. Professionals can use different methods to implement the described functions for each specific application, but such implementation should not be considered as going beyond the scope of the present application.

Those skilled in the art may clearly understand that, for the purpose of convenience and briefness in description, for the specific working processes of the above-described systems, devices and units, reference could be made to the corresponding processes in the embodiments of the aforementioned methods, and description is not repeated here.

In the several embodiments provided in the present application, it should be understood that the disclosed systems, devices and methods may be realized in other modes. For example, the embodiments of the above-described devices are only exemplary, for example, the division of the units is only a logic function division, other division modes may be adopted in practice, e.g., a plurality of units or components may be combined or integrated in another system, or some characteristics may be omitted or not executed. In addition, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on a plurality of network units. The objectives of the solutions of the embodiments of the present application may be fulfilled by selecting part of or all of the units according to actual needs.

When the integrated unit is realized in the form of a software functional unit and sold or used as an independent product, the integrated unit may be stored in a computer readable storage medium. Based on such an understanding, the technical solution of the present application substantially, or the part of the present application making contribution to the prior art, or all or part of the technical solution may be embodied in the form of a software product, and the computer software product is stored in a storage medium, which includes a plurality of instructions enabling computer equipment (which may be a personal computer, a server, or network equipment or the like) to execute all or part of the steps in the methods of the embodiments of the present application. The aforementioned storage medium includes: various media capable of storing program codes, such as a U disk, a mobile hard disk, a read-only memory (ROM), a random access memory (RAM), a magnetic disk or an optical disk.

The above description is the specific embodiments of the present application only, but the scope of the present application is not limited thereto, any skilled who is familiar with this art could readily think of variations or substitutions within the disclosed technical scope of the present application, and these variations or substitutions shall fall within the scope of the present application. Thus, the scope of the present application shall be subjected to the scope of the claims.

The invention claimed is:

1. An image preprocessing method for processing a JPEG image performed by an electronic device having a processor, a display, and memory for storing instruction to be executed by the processor, the method comprising:

receiving a JPEG image to be processed;

displaying the JPEG image on the display of the electronic device;

de-noising the received JPEG image by using a pre-trained full convolutional network model stored in the memory to obtain a de-noised and resolution-improved image; and displaying the de-noised and resolution-improved image on the display, wherein the full convolutional network model is derived via the following training steps:

a. randomly initializing parameters of the full convolutional network model on the electronic device;

b. randomly selecting batchsize sample pictures, and randomly cutting an image, of which the size is W*H, on each sample picture as a target image sample for this iteration, wherein batchsize indicates a batch size;

c. normalizing each pixel in the target image sample;

d. performing n-fold resolution reduction of bilinear interpolation on the target image samples, and performing JPEG compression according to a random compression ratio to obtain simulated JPEG compression images of which the size is $$\frac{W}{n} * \frac{H}{n},$$

wherein n is a positive integer;

e. inputting the batchsize JPEG images obtained in step d to the full convolutional network model of step a to obtain output images of which the size is W*H;

f. calculating a current mean square error loss for this current iteration:

$$loss = \frac{1}{Batchsize * W * H} \sum_{x=1}^{W} \sum_{y=1}^{H} (target - output)^2,$$

wherein target is a target value of a target image sample, and output is an output value obtained by inputting the corresponding JPEG image after the n-fold resolution reduction to the full convolutional network model;

g. updating the parameters of the current full convolutional network model by using a BP algorithm; and h. repeatedly executing, by the electronic device, steps b to g until reaching a preset number of iterations.

2. The method according to claim 1, wherein the full convolutional network model comprises an input layer, convolutional layers, an activation layer, residual modules, a batch norm (BN) layer and a sub-pixel layer.

3. The method according to claim 1, wherein after the de-noised and resolution-improved image is obtained, the method further comprises the following step: de-normalizing each pixel in the obtained de-noised and resolution-improved image to 0-255.

4. An electronic device for processing a JPEG compressed file, comprising:

a processor;

a display;

memory; and a plurality of computer instructions stored in the memory, wherein the computer instructions, when executed by the processor, cause the electronic device to perform operations including:

receiving a JPEG image to be processed;

displaying the JPEG image on the display of the electronic device;

de-noising the received JPEG image by using a pre-trained full convolutional network model stored in the memory to obtain a de-noised and resolution-improved image; and displaying the de-noised and resolution-improved image on the display, wherein the full convolutional network model is derived via the following training steps:

a. randomly initializing parameters of the full convolutional network model on the electronic device;

b. randomly selecting batchsize sample pictures, and randomly cutting an image, of which the size is W*H, on each sample picture as a target image sample for this iteration, wherein batchsize indicates a batch size;

c. normalizing each pixel in the target image sample;

d. performing n-fold resolution reduction of bilinear interpolation on the target image samples, and performing JPEG compression according to a random compression ratio to obtain simulated JPEG compression images of which the size is $$\frac{W}{n} * \frac{H}{n},$$

wherein n is a positive integer;

e. inputting the batchsize JPEG images obtained in step d to the full convolutional network model of step a to obtain output images of which the size is W*H;

f. calculating a current mean square error loss for this current iteration:

$$loss = \frac{1}{Batchsize * W * H} \sum_{x=1}^{W} \sum_{y=1}^{H} (target - output)^2,$$

wherein target is a target value of a target image sample, and output is an output value obtained by inputting the corresponding JPEG image after the n-fold resolution reduction to the full convolutional network model;

g. updating the parameters of the current full convolutional network model by using a BP algorithm; and h. repeatedly executing, by the electronic device, steps b to g until reaching a preset number of iterations.

5. The device according to claim 4, wherein the full convolutional network model comprises an input layer, convolutional layers, an activation layer, residual modules, a BN layer and a sub-pixel layer.

6. The device according to claim 4, wherein the plurality of computer instructions further comprise instructions for obtaining the full convolutional network model by training.

7. The device according to claim 4, wherein the plurality of computer instructions further comprise instructions for de-normalizing each pixel in the obtained de-noised and resolution-improved image to 0-255.

8. A non-transitory computer readable storage medium comprising computer readable instructions that, when executed by a processor of an electronic device having a display, cause the electronic device to perform operations including:

receiving, by the electronic device a JPEG image to be processed and displaying it on a display of the electronic device;

de-noising the received JPEG image by using a pre-trained full convolutional network model stored in the electronic device to obtain a de-noised and resolution-improved image; and displaying the de-noised and resolution-improved image on the display;

receiving a JPEG image to be processed;

displaying the JPEG image on the display of the electronic device;

de-noising the received JPEG image by using a pre-trained full convolutional network model stored in the memory to obtain a de-noised and resolution-improved image; and displaying the de-noised and resolution-improved image on the display, wherein the full convolutional network model is derived via the following training steps:

a. randomly initializing parameters of the full convolutional network model on the electronic device;

b. randomly selecting batchsize sample pictures, and randomly cutting an image, of which the size is W*H, on each sample picture as a target image sample for this iteration, wherein batchsize indicates a batch size;

c. normalizing each pixel in the target image sample;

d. performing n-fold resolution reduction of bilinear interpolation on the target image samples, and performing JPEG compression according to a random compression ratio to obtain simulated JPEG compression images of which the size is $$\frac{W}{n} * \frac{H}{n},$$

wherein n is a positive integer;

e. inputting the batchsize JPEG images obtained in step d to the full convolutional network model of step a to obtain output images of which the size is W*H;

f. calculating a current mean square error loss for this current iteration:

$$\text{loss} = \frac{1}{Batchsize * W * H} \sum_{x=1}^{W} \sum_{y=1}^{H} (\text{target} - \text{output})^2,$$

wherein target is a target value of a target image sample, and output is an output value obtained by inputting the corresponding JPEG image after the n-fold resolution reduction to the full convolutional network model;

g. updating the parameters of the current full convolutional network model by using a BP algorithm; and h. repeatedly executing, by the electronic device, steps b to g until reaching a preset number of iterations.

9. The non-transitory computer readable storage medium according to claim 8, wherein the full convolutional network model comprises an input layer, convolutional layers, an activation layer, residual modules, a batch norm (BN) layer and a sub-pixel layer.

10. The non-transitory computer readable storage medium according to claim 8, wherein after the de-noised and resolution-improved image is obtained, the method further comprises the following step: de-normalizing each pixel in the obtained de-noised and resolution-improved image to 0-255.

* * * * *